C. F. ERB.
APPARATUS FOR RECOVERING RUBBER FROM ARMORED HOSE AND THE LIKE.
APPLICATION FILED JULY 21, 1919.
1,349,752. Patented Aug. 17, 1920.
2 SHEETS—SHEET 1.
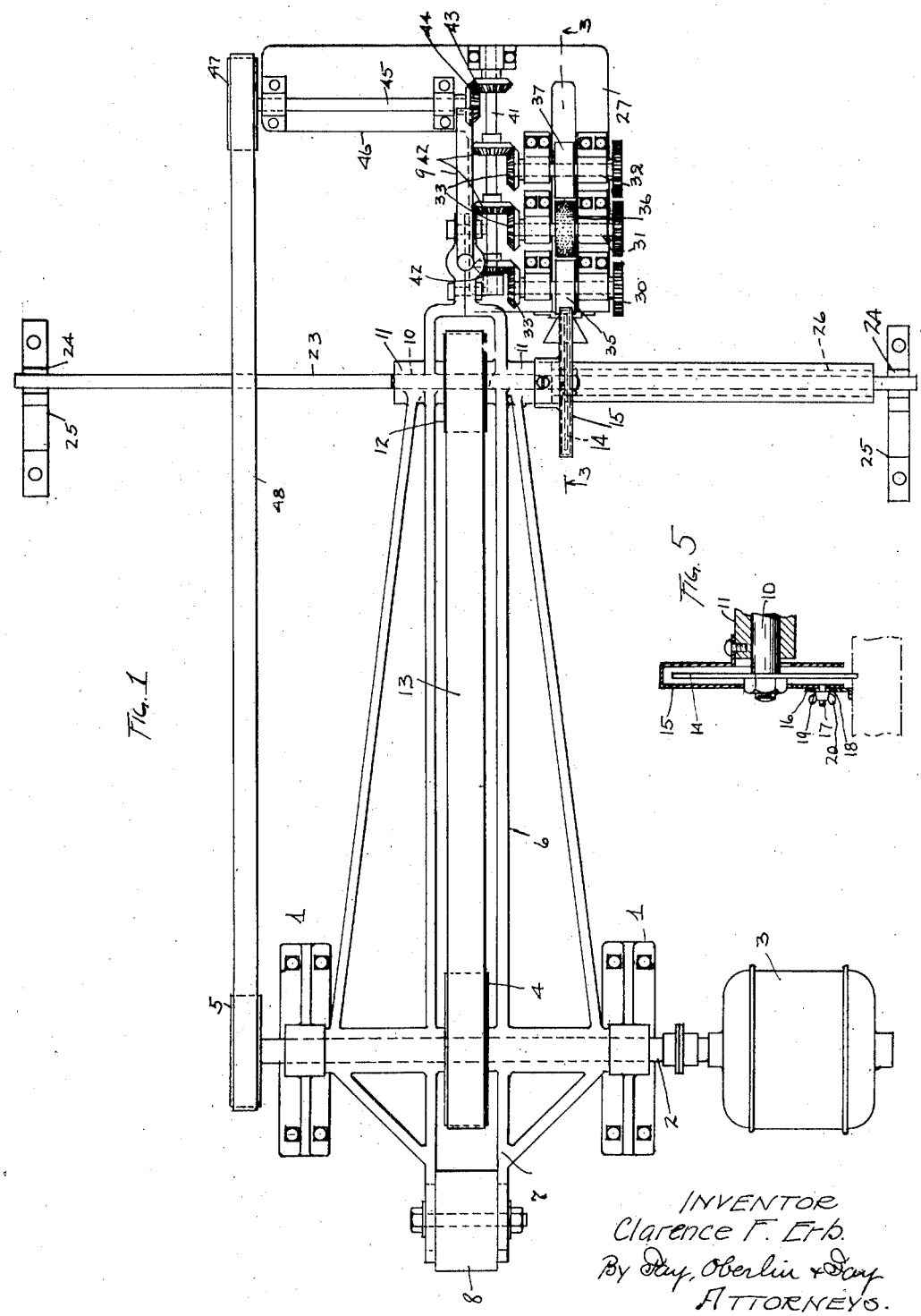
INVENTOR
Clarence F. Erb.
By Day, Oberlin & Day
ATTORNEYS.

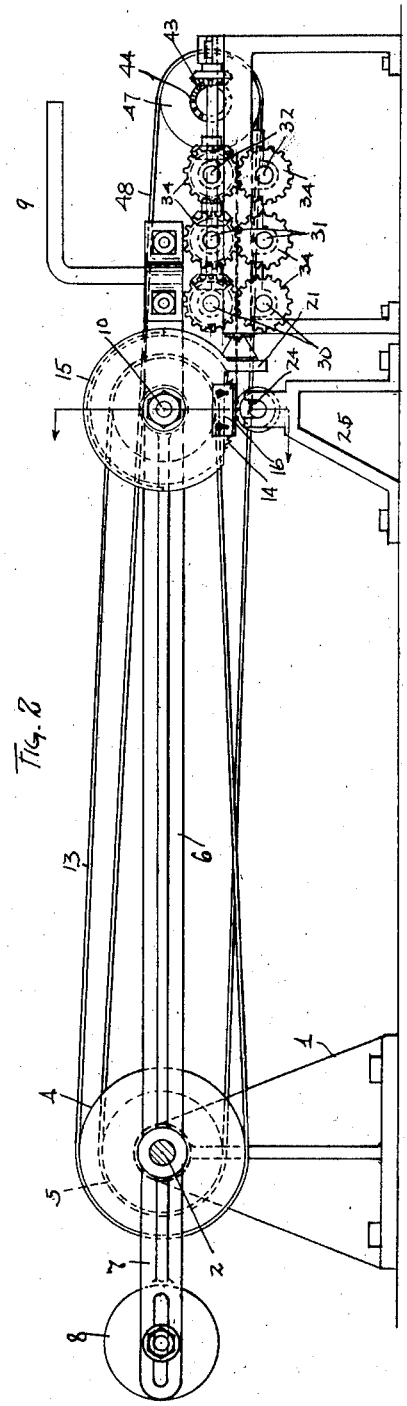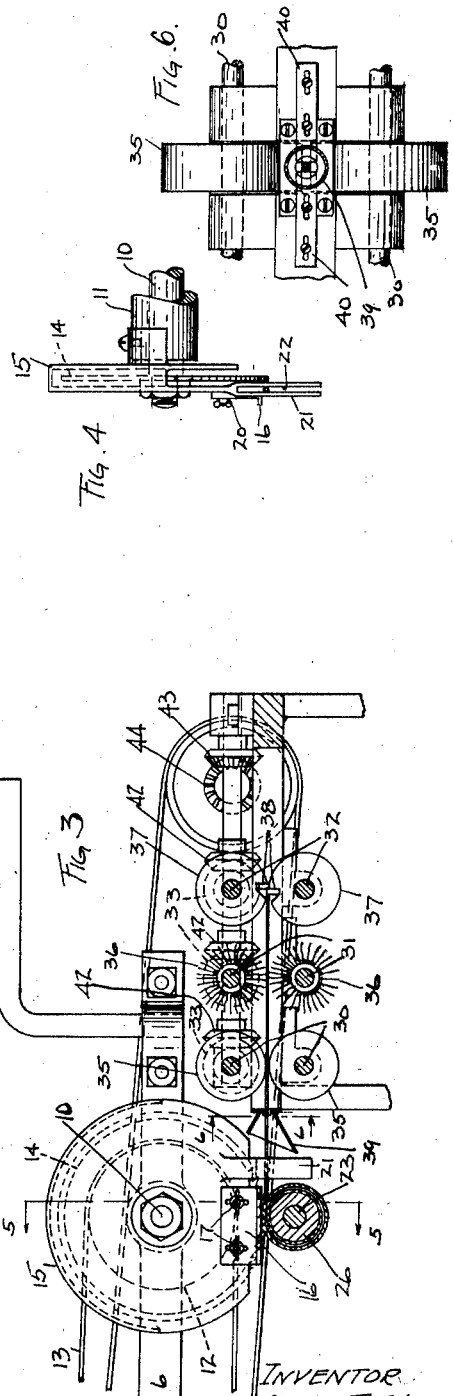

UNITED STATES PATENT OFFICE.

CLARENCE F. ERB, OF YOUNGSTOWN, OHIO.

APPARATUS FOR RECOVERING RUBBER FROM ARMORED HOSE AND THE LIKE.

1,349,752. Specification of Letters Patent. Patented Aug. 17, 1920.

Application filed July 21, 1919. Serial No. 312,184.

*To all whom it may concern:*

Be it known that I, CLARENCE F. ERB, a citizen of the United States, and a resident of Youngstown, county of Mahoning, and State of Ohio, have invented a new and useful Improvement in Apparatus for Recovering Rubber from Armored Hose and the like, of which the following is a specification, the principle of the invention being herein explained and the best mode in which I have contemplated applying that principle, so as to distinguish it from other inventions.

The present apparatus relates to apparatus for removing the wire from armored hose so that the fabric and rubber may be recovered in suitable condition for reclamation. It relates in particular to means for cutting the hose so that the wire armor between the layers of fabric may be pulled out leaving the fabric and rubber free from metal. Means are also provided for withdrawing the wire and cleaning and reclaiming said wire or cable. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of my apparatus; Fig. 2 is a side elevation; Fig. 3 is a section on line 3—3, Fig. 1, and Figs. 4, 5 and 6 are views of details of construction.

The apparatus consists of a suitable stand or base portion 1 in which a shaft 2 is mounted which is coupled at one end to a motor 3 although any suitable driving means may of course be employed. Between the bearings the shaft is provided with a pulley 4 and the shaft has a second pulley 5 on its outer end. Loosely and pivotally mounted on the shaft is a frame work 6 provided at one end with an extending arm 7 carrying a counter weight 8.

At its forward end the frame work carries a shaft 10 mounted in suitable bearings 11 and provided with a pulley 12, which is driven from the pulley 4 by a belt 13. On the extending end of the shaft 10 is mounted a saw 14 which runs in a housing 15 open at the bottom and provided with a plate 16 along the bottom edge. This plate is adjustably attached to the casing by means of bolts 17 which pass through suitable apertures 18 in the casing and through slots 19 in the plate, wing nuts 20 being provided to clamp the plate securely to the casing. Attached to the casing is a guide 21 having a forked end through the slot 22 of which the wire from the hose will slide, this guide serving to keep the wire away from the saw at all times. A handle 9 is mounted on the forward end of the frame work so that the saw may be moved down into position, the counter weight normally maintaining the saw and frame work in its upward position.

Directly below the saw is mounted a shaft 23 carried in open bearings 24 in two stands 25 and on this shaft will be mounted a mandrel 26 carrying a length of hose to be cut up. The shaft is of course about twice as long as the mandrel which is free to move along the shaft to bring the hose under the saw.

In front of the saw a case 27 is mounted on a suitable base 29, and in the case are mounted pairs of short shafts 30, 31 and 32, the upper shaft of each pair being provided with a bevel gear 33. The other ends of all the shafts extend beyond the case and carry spur gears 34 the gears of each pair being in mesh. The shafts 30 carry feed rolls 35 which have roughened surfaces adapted to grip the wire and pull it through the case as the hose is cut. On the shafts 31 are mounted wire brushes 36 or the like to brush and clean the wire, and on the third pair of shafts 32 are mounted cutting rolls 37 provided with cutting edges 38 adapted to cut the wire into short lengths.

At its forward end the case is provided with a bell-shaped guideway 39 adapted to receive the wire from the saw guide and lead it into the feeding rolls. Within the case between the feed rolls and the front of the case two scrapers 40 are provided which are adapted to scrape the sides of the wire as rubber strips are often left attached to the side of the wire as it is pulled out. Lengthwise of the case is mounted a shaft 41 which is provided with three bevel gears 42 in engagement with the bevel gears 33 on the shafts 30, 31 and 32. At its rear end this shaft carries another bevel gear 43 in mesh with a gear 44 on a cross shaft 45 carried in an extension 46 of the case. This cross shaft 45 extends outwardly of the case and has at its outer end a pulley wheel 47 which is connected to the pulley wheel 5 on the driving shaft 2 by means of a belt 48.

In operating the device the hose to be cut is first placed upon the mandrel which is then mounted on the shaft. The hose is first cut and the wire pulled out sufficiently so that it may be fed into the rolls. The saw is then started and brought down on to the hose and the hose will be cut closely adjacent the wire. As the wire is pulled out by the feeding rolls the mandrel will be revolved and moved along the shaft, the wire pulling it along as it unwinds.

The wire is of course wound spirally in the hose and thus as it unwinds moves the hose and mandrel along the shaft keeping the hose correctly positioned under the saw at all times. By adjusting the plate on the saw housing the depth of cut may be regulated. The cut is made close to the wire and the feed rolls then pull or tear the wire loose from the fabric leaving the latter in such shape that the rubber may be reclaimed.

The present apparatus is particularly designed for removing the wire from steam line hose in which the wire armor is placed between the layers of fabric. The saw is held down on to the hose and when the operator releases the handle the saw tilts upwardly and the mandrel and shaft may be removed. Usually several mandrels will be used and the operator merely substitutes one mandrel for another. The wire is cleaned and cut into short lengths and recovered as scrap. The apparatus is simple and easy to operate and may be readily assembled and adjusted.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a rotatable and longitudinally movable hose carrying mandrel, cutting means mounted above said mandrel and adapted to be moved into contact with the hose thereon and means for pulling the armor loose from the hose.

2. In apparatus of the character described, the combination of a rotatable and longitudinally movable hose carrying mandrel, cutting means mounted above said mandrel and adapted to be moved into contact with the hose thereon, and feed rolls adapted to receive the armor from said hose and pull the same away as the hose is cut by said saw.

3. In apparatus of the character described, the combination of a rotatable and longitudinally movable hose carrying mandrel, cutting means mounted above said mandrel and adapted to be moved into contact with the hose thereon, means for pulling the armor from the hose as it is cut, and other means for cleaning the armor.

4. In apparatus of the character described, the combination of a rotatably and longitudinally movable hose carrying mandrel, cutting means mounted above said mandrel and adapted to be moved into contact with the hose thereon, means for pulling the armor from the hose as it is cut, means for cleaning the armor and means for cutting the armor into short lengths.

5. In apparatus of the character described, the combination of a rotatable hose carrying mandrel capable of longitudinal movement, a pivotally mounted frame, a saw carried by said frame over said mandrel and adapted to be moved into engagement with the hose thereon.

6. In apparatus of the character described, the combination of a shaft, a hose carrying mandrel rotatably mounted on said shaft and adapted to move along the same, a second shaft, a frame pivotally mounted on said second shaft, a saw mounted in said frame over said mandrel and adapted to be moved into engagement with the hose on said mandrel to cut the same, and means carried by said frame and adapted to regulate the depth of cut of the saw.

7. In apparatus of the character described, the combination of a shaft, a hose carrying mandrel rotatably mounted on said shaft and adapted to move along the same, a second shaft, a frame pivotally mounted on said second shaft, a saw mounted in said frame over said mandrel and adapted to be moved into engagement with the hose on said mandrel to cut the same to release the armor, means carried by said frame to adjust the depth of such cut, and other means adapted to pull the armor from the hose.

8. In apparatus of the character described, the combination of a shaft, a hose carrying mandrel rotatably mounted on said shaft and adapted to move along the same, a second shaft, a frame pivotally mounted on said second shaft, a saw mounted in said frame over said mandrel and adapted to be moved into engagement with the hose on said mandrel to cut the same to release the armor, means carried by said frame to adjust the depth of such cut, means adapted to pull the armor from said hose, and other means adapted to clean such armor and to cut the same into short lengths.

9. In apparatus of the character described, the combination of a base, a power shaft rotatably mounted therein, a counterweighted frame pivotally mounted on said shaft, a saw rotatably mounted in said frame, means for driving said saw from said power shaft, a shaft mounted transversely below said saw, a hose carrying mandrel rotatably mounted upon said last named shaft and capable of movement along the shaft, said saw being adapted to be moved into engagement with the hose on the same to cut such hose and release the armor, means for adjusting the depth of such cut, and means for pulling the armor from such hose as the hose is cut.

10. In apparatus of the character described, the combination of a base, a power shaft rotatably mounted therein, a counter weighted frame pivotally mounted on said shaft, a saw rotatably mounted in said frame, means for driving said saw from said power shaft, a shaft mounted transversely below said saw, a hose carrying mandrel rotatably mounted upon said last named shaft and capable of movement along the shaft, said saw being adapted to be moved into engagement with the hose on the same to cut such hose and release the armor, means for adjusting the depth of such cut, means for pulling the armor from the hose as such hose is cut, and other means for cleaning such armor and cutting the same into short lengths.

Signed by me this 18th day of July, 1919.

CLARENCE F. ERB.